Nov. 22, 1932.  B. S. HIND ET AL  1,888,317
AUTOMATIC CONVERTER OPERATING DEVICE
Filed Feb. 15, 1930    3 Sheets-Sheet 2
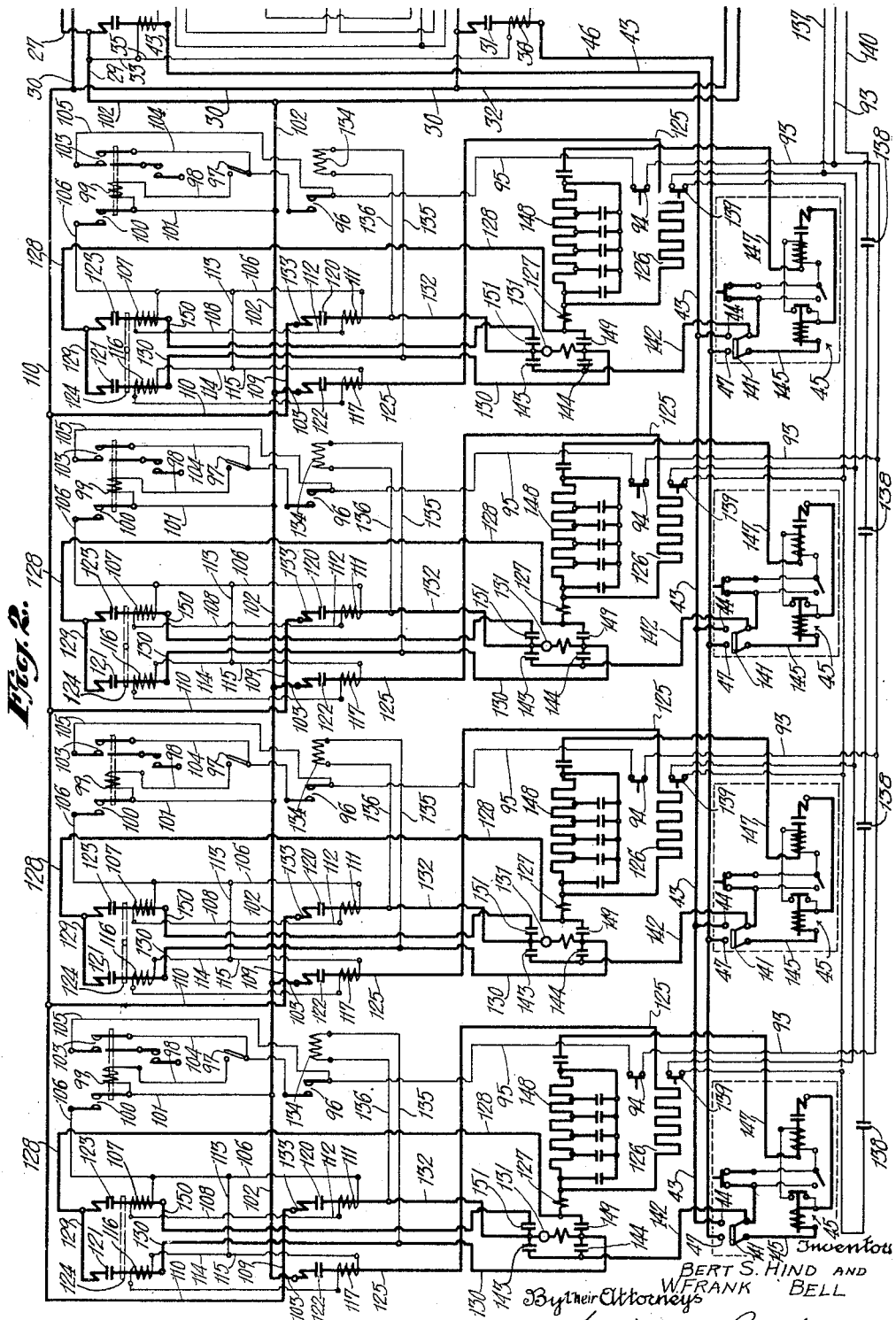

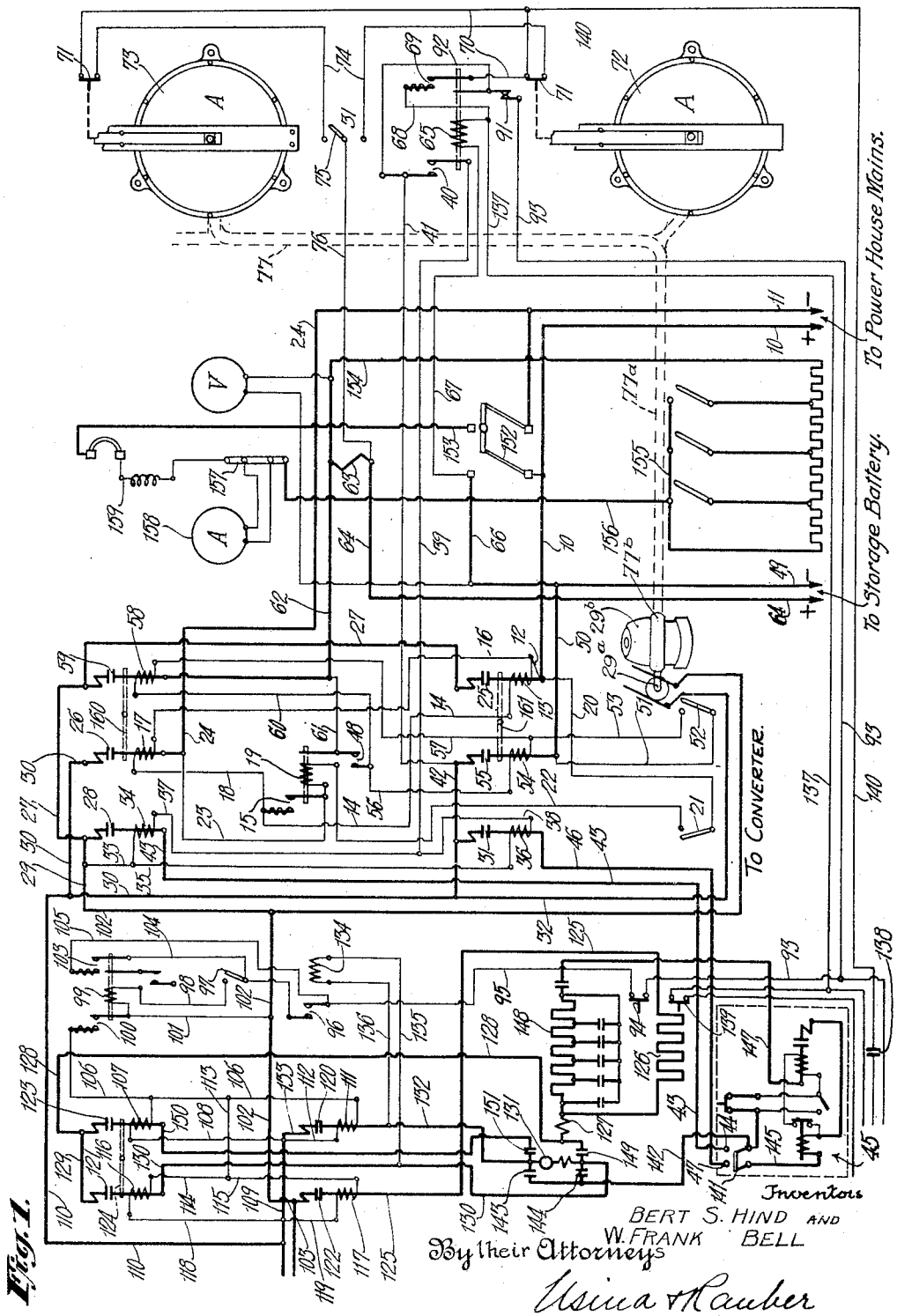

Nov. 22, 1932.   B. S. HIND ET AL   1,888,317
AUTOMATIC CONVERTER OPERATING DEVICE
Filed Feb. 15, 1930    3 Sheets-Sheet 3
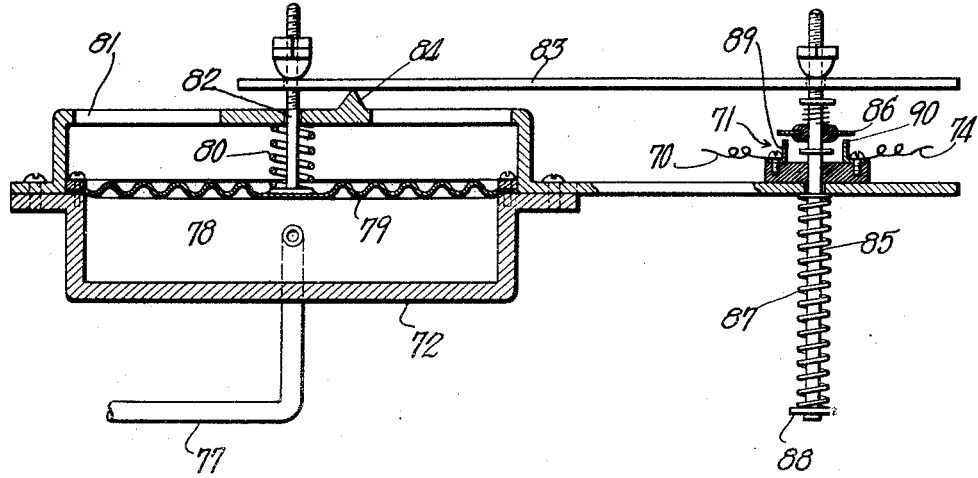
Inventors
BERT S. HIND AND
W. FRANK BELL
By their Attorneys Patented Nov. 22, 1932

1,888,317

UNITED STATES PATENT OFFICE

BERT S. HIND AND WILLIAM FRANK BELL, OF POTRERILLOS, CHILE

AUTOMATIC CONVERTER OPERATING DEVICE

Application filed February 15, 1930. Serial No. 428,559.

This invention relates to apparatus for automatically controlling metallurgical converters and similar apparatus in which a blast of air is blown through molten metal.

An object of the invention is to protect the converter from injury due to failure of power supply or failure of the air at the pressure required to maintain a blast or current of air through the molten metal.

In metallurgical converters and similar apparatus air must be supplied continuously at a sufficient pressure to force it into and through the metal or fused charge in the converter at all times when the latter is charged with molten material. Should the air supply fail or the pressure at which it is supplied fall below that required to force it into the converter, the fused material would flow into the air channels and would solidify in the channels and in the lower part of the converter. The removal of the solidified material would present considerable difficulty.

An object of our invention is, therefore, to provide means that will automatically tip the converter out of the stack and empty it of fused material upon the failure of the air supply at the required pressure.

The converter is tilted by means of a motor, usually a series motor, driven from the mains of the smelter power house. In the event of a failure of power from this source it would probably be accompanied by a failure of air for the converter. The tilting motor could not operate without power from this source and, therefore, the automatic tilting apparatus would not function in such event.

Another object of the invention is, therefore, to provide means for automatically connecting the converter tilting mechanism with an auxiliary source of power, as with a storage battery, upon a failure of the main source of power; and to provide means whereby the storage battery may be charged upon the renewal of energy in the power mains.

With these and other objects in view which will be apparent from the following description, the invention comprises the method and apparatus described and claimed in the following specification and claims.

The various features of the invention are illustrated in the accompanying drawings, in which—

Fig. 1 is a wiring diagram of an apparatus embodying a preferred form of the invention as applied to a single converter and converter tipping motor, the power circuits being shown in heavy lines and the high resistance control circuits in light lines.

Fig. 2 is a similar diagram of a portion of control and tipping devices for several converters, and Fig. 3 is a sectional view of an air trip switch actuated by pressure in the air main of the converters.

In the present invention two alternative sources of power are provided for operating the converter tilting motors and casting machines. One of these sources of power is the mains of the smelter power house and the other is a storage battery which may be charged from the power mains. When the power mains are energized, an automatic mechanism connects the mains with the conductors leading to the tilting motors and casting machines. However, when the power mains from the smelter power house fail and are deenergized, the control mechanism automatically disconnects these mains from, and connects the storage batteries to, the converter tilting motors and casting machines. When the pressure in the air supply mains for the converters falls below the operating minimum, for example, about 8 pounds, an air control valve operated by this pressure actuates a control mechanism which disconnects the power supply from the manual control apparatus of the tilting motors and casting machines so that all manual control is removed. At the same time the air control mechanism connects the power mains to the converter tilting motor in a manner to drive it in tilting direction until the tilting has been completed. The converter remains tilted downwardly until the air supply has been restored. By the operation of suitable manual restoring means the manual control of the tilting motors may be restored and the converter tilted to its upright working condition upon the re-establishment of the air supply.

Referring more particularly to Fig. 1 of the drawings, direct current power is supplied from the smelter power house through a pair of mains 10 and 11. The main 10 is indicated as the positive wire and the main 11 as the negative, but it will be understood that these wires might be reversed with a suitable reversal of the other parts of the mechanism. From the main 10 current flows through the wire 12 of a control circuit, then divides, part of the current passing through a coil 13 and wire 14 to a contact 15, while the other part flows through a branch circuit 16 to a coil 17 and thence through a return wire 18 to the contact 15. The contact 15 is controlled by an electro-magnetic coil 19 and is closed by the passage of current from the main 10 through a control circuit wire 20, thence through a switch 21, which is closed, and a wire 22 leading to the magnet 19 and a return wire 23 that connects to an extension 24 of the negative power main 11. When the contact 15 is thus closed, the current flows from the wire 18 through contact 15 to the wire 23 and thus to the negative main 11. The coils 13 and 17 are thus energized by the passage of the current and close contactors 25 and 26 controlled respectively by the coils 13 and 17. The closing of contactor 25 connects the positive main 10 of the smelter power house to a conductor 27 which leads to a contactor 28 and to a branch circuit 29 leading to the motor, indicated diagrammatically at 29a, of a casting machine or converter indicated diagrammatically at 29b. Similarly, the closing of contactor 26 connects the extension 24 of the negative main to a conductor 30 that also leads to a contactor 31 and to a branch connector 32 leading to the casting machine circuits.

When the conductor 27 is connected to the main 10 current flows from this conductor through a control circuit wire 33 and divides, one part of the current flowing through an electro-magnetic coil 34 that controls and closes the contactor 28, and the other part of the current flowing through a branch conductor 35 to an electro-magnetic coil 36 that controls and closes the contactor 31. From the coils 34 and 36 the current returns through branch wires 37 and 38 and thence through a return wire 39 that leads to a switch 40 controlled by the air pressure in the converter mains in the manner hereinafter described.

From the air controlled switch 40 the current returns through a return wire 41 leading to a power conductor 42 which is connected to the conductor 30, and thence through the contactor 26 and main extension 24 to the negative main 11. As the electro-magnetic coils 34 and 36 are thus energized and the contactors 28 and 31 close, power current flows from the conductor 27 through the closed contactor 28 to a main 43 leading to a switch terminal 44 in a protective panel 45 and motor circuit control apparatus thereby connecting the motor for manual operation to the main 10. The negative main 11 is similarly connected through the branch wire 24, closed contactor 26, conductor 30, branch conductor 42 and the closed contactor 31 to a main 46 leading to a switch terminal 47 of the protective panel 45 and motor circuits. Under the above conditions the converter motor is actuated, under suitable manual control, from the mains 10 and 11 of the smelter power house.

In the event that the power in the smelter power house mains should fail for any cause, there would be a failure of current through the coil 19 inasmuch as the mains 10 and 11 from which this current is taken are now dead. The contactors 15 would then be open, thereby breaking the circuits through the electro-magnetic coils 34 and 36 and causing the contactors 28 and 31 to open. Similarly, failure of current through the electro-magnetic coils 13 and 17 will cause the contactors 25 and 26 to open. As the current through the coil 19 fails and the coils become de-energized, the core of the coil, after opening the contactors 15, closes a pair of contactors 48. Current now flows from a main 49 connected to the negative pole of the storage batteries to a branch main 50 and thence to a control circuit 51. From the circuit wire 51 the current flows through a switch 52 which is closed, and a wire 53 and then branches, one part of the current flowing through an electro-magnetic coil 54 controlling and closing a pair of power contactors 55 and thence returning through a return wire 56 to the closed contactor 48. The other part of the current flows through a branch wire 57 to an electro-magnetic coil 58 that controls a pair of power contactors 59 and thence returns through a return wire 60 to the closed contact 48. From the contact 48 the current returns through a return wire 61 through a power line 62 which is connected through a fuse 63 to a main 64 leading to the positive pole of the battery.

The closing of the power contactors 55 and 59 connects the main 49 and branch 50 with the conductor 42 and connects the main 64 through the fuse 63 and conductor 62 with the conductor 27 thus connecting the wires 27 and 42 with a source of electrical energy. Current is then re-established through the electro-magnetic coils 34 and 36 in the manner described above, closing the contactors 28 and 31 and again connecting the terminals 44 and 47 with a source of electrical energy, the energy in this case being the mains 49 and 64 of the storage battery.

From the above it will be apparent that upon failure of the power in the mains of the smelter power house, the batteries will automatically be connected to the converter tilting motors so that these motors will always be assured of power. Upon a return of power to the mains 10 and 11 the coil 19 will again become energized, closing the contacts 15 and opening the contacts 48, thus disconnecting the batteries from the motors and again connecting the mains of the smelter power house thereto.

From the above it will be understood that alternately the coils 13 and 17 close the contactors 25 and 26 connecting in the power house mains and the coils 54 and 58 close the contactors 55 and 59 connecting in the battery mains to the contactors 28 and 31, there being simply two different circuits and sources of supply automatically controlled so that one will be cut in when power in the other one fails, and will be cut out of the circuit when power in the first circuit is restored. It will also be understood that the supply of power from either of these circuits to the converter tilting motors and the casting machines is controlled through the contactors 28 and 31 by means of control coils 34 and 36 respectively, and that these coils are energized by a current passing through an air control switch or contactors 40.

It will, therefore, be understood that when the switch or contactors 40 are open, the coils 34 and 36 will be de-energized, opening the contactors 28 and 31 and disconnecting the casting machines and the converter tilting motors through their manual controls from the power house and battery sources of power.

The closing of the circuit 40 is controlled by means of a coil 65, the switch being closed when the coil 65 is energized, and open when the coil is de-energized. Current for the coil 65 is supplied from the battery through a branch main 66 and a control circuit wire 67 which leads to the coil 65, and a return circuit comprising a wire 68 and switch 69 also controlled by the coil 65, wire 70 and switches 71 controlled by either of two alternative air trips 72 or 73, and thence through wires 74, and switch 75, that connects with the switches 71 of either of the trips 72 or 73 and a return wire 76 leading to the main 64 returning to the positive pole of the battery.

The air trips 72 and 73 are identical. Their construction is shown in Fig. 3. In this construction air from the converter air supply main 77a, indicated as connected to the bustle pipe 77b of the converter 29b, is conducted through a pipe 77 to the interior of a box 78 one wall of which comprises a flexible diaphragm 79 which is acted upon from one direction by the air pressure. The pressure of air on the diaphragm 79 is counteracted by means of a spring 80 confined between the outer face of the diaphragm and a bracket 81 secured to flanges on the box or chamber 72. When the pressure of the air supply is above the minimum required for operating the converters it forces the diaphragm 79 outwardly against the action of the spring 80.

The outward movement of the diaphragm 79 is transmitted through a rod 82 at one end of a lever 83 fulcrumed at 84 on the bracket 81. On the outer end of the lever is mounted a rod 85 which carries the movable contact bar 86 of the switch 71. When the lever 83 is tilted by the pressure of the air in the box 78 against the spring 80 the rod 85 is drawn downwardly by means of a spring 87 confined between a plate 88 on the lower end of the rod 85 and a projection of the bracket 81, thereby bringing the movable contact 86 into contact with terminals 89 and 90 that are connected respectively to the contact wires 70 and 74. The contact plate 86 has a spring connection with the rod 85 that will permit a relative movement of the rod after the contact 86 has been brought to rest on the terminals 89 and 90. Upon a lowering of the pressure of the air in the chamber or box 78 below the minimum required to operate the converter, the lever 83 is tilted by the spring 80 to lift the rod 85 and open the switch 71.

Upon the opening of the switch 71 the circuit through the coil 65 is disconnected and opened, thereby opening the contactors or switch 40. As a result the circuit through the coils 34 and 36 is broken, these coils are de-energized and the contactors 28 and 31 are opened, thereby disconnecting the terminals 47 and 44 of the manually controlled circuits for the converter tilting motor from both the battery terminals and the smelter house mains.

It will also be understood that the de-energizing of the coil 65 opens the contacts through the switch 69 so that current through the coil 65 cannot be re-established by a mere closing of the switch 71 after the latter has been once opened.

The de-energizing of the coil 65 and consequent shifting of its core to the right closes a switch 91, one terminal of which is connected through a wire 92 to the wire 41 which, in turn, is connected to the battery terminal 49 through the conductor 50 and contactor 55, or through the conductor 30, contactor 26 and branch 24 to the power house main 11, whichever happens to be connected to the power circuit 42. The other terminal of the switch 91 is connected through a wire 93 and through a limit switch 94 which is connected to the converter tilting motor and remains closed until the latter has reached the limit of its tilting movement, and thence through a wire 95 to a time limit switch 96. From the time limit switch 96 the current flows through a switch 97 which is closed and thence through a wire 98 to a coil 99 controlling a switch 100. From the coil 99 the current flows through a conductor 101 to a power line 102 connected to the power line 29 and thence to the positive pole of the power line 10 through the contactor 25. The energizing of the coil 99 also closes a switch 103, thereby by-passing the current through the time control switch 96 through wires 104 and 105 and maintaining a current through the coil 99 after the time control switch 96 has opened. The closing of the switch 100 connects the positive power terminals of the batteries or power house mains from the conductors 27 and 102 through the wire 101 to a control circuit wire 106.

From the wire 106 the current flows through a branch wire to a coil 107 and thence through a return line 108 to a power line 109 which is connected through a return line 110 to the negative power line 30. Similarly, current flows from the wire 106 through a coil 111 and a branch wire 112 to the wire 109 and also through a wire 113 and branch wires 114 and 115 to coils 116 and 117 and through return wires 118 and 119 to the power line 109, and thence through the line 110 to the negative power line 30. Each of the coils 107, 111, 116 and 117 are thereby energized. The coils 111, 116 and 117 act to close their respective contactors 120, 121 and 122, and the coil 107 acts in a reverse manner to open its respective contactor 123 when it is energized. Inasmuch as the coils 107 and 116 act in opposite directions on their respective contactors 123 and 121, these contactors may be connected through an interlocking lever 124.

When the contactors 120, 121 and 122 have been closed and the contactor 123 opened in the manner described above, current flows from the positive power wire 27 through the power line 102 and 103, thence through the closed contactor 122 to a conductor 125. The conductor 125 leads through a resistance 126 in the automatic circuit of the motor and thence through the field circuit 127 of a series converter tilting motor. From the field winding 127 the current flows through a power line 128 which branches to lead to the contactors 121 through a line 129. From the line 129 the current passes through the contactors 121 and a conductor 130 to one brush of the armature 131 of the series converter tilting motor.

From the positive brush of the armature 131 the current passes through a return line 132 to the contactors 120 and thence through a return line 133 to the return wires 109 and 110 and thence to the negative power line 30 which is connected either to the battery or smelter power house main. During this period the contactors 28 and 31 have remained open inasmuch as their controlling coils or solenoids 34 and 36 are de-energized by the breaking at the contact 40 of the circuit through them and by the breaking of the circuit through the control magnet 65 at the contact 69, the solenoid 65 and contact 69 acting as a "stick" relay. Therefore, current cannot be supplied through the ordinary manually controlled apparatus for rotating the tilting motor in one direction or the other. The arrangement of the circuits through the contactors 120, 121 122 is such that the current passes through the armature 131 in such a direction relative to its passage through the field magnet 127 as to rotate the tilting motor in the direction to tilt the converter. As the motor reaches the limit of its tilting movement it disconnects the limit switch 94 thereby breaking the circuit through the magnet 99. Thereupon the contactors 103 and 100 open, breaking the circuits through the coils 107, 111, 116 and 117, opening the contactors 120, 121 and 122 and closing the contactor 123. This places the apparatus in condition for restoration to manual control.

It will be noted that the time limit switch 96 is controlled by means of a solenoid or coil 134 which is connected by wires 135 and 136 and across power lines 130 and 132 so that the opening action of the switch 96 does not begin until after the contactors 120—123 have been closed and consequently after the solenoid 99 has been energized and the by-pass switch 103 closed.

To restore the apparatus to manual control the open contactor 69 must be by-passed and that part of the solenoid or coil 65 that is connected to the wire 68 must be connected through a by-pass circuit to the wire 70. For this purpose two reset buttons or switches must be closed in the by-pass circuit, one of these buttons 139 being closed when the converter tilting motor has reached the limit of its tilting movement, and the other 138 of which may be closed manually. The by-pass current then passes from the end of the solenoid 65 through a circuit wire 137 comprising a manually closable switch or push button 139 and a reset contact 138 that is located inside of the controller and is closed when the handle is in the "off" position, through wire 140 that leads to the wire 70 and thence through the air controlled switches 71 and 75 to the return wire 76 and the battery main 64. Immediately upon the by-passing of the open switch 69 the solenoid 65 is energized closing the switches or contactors 40 and 69 and restoring all of the circuits to their original position.

Switch 141 ordinarily remains closed, and is dead when contactors 31 and 28 are open. This switch is opened only when it is desired to work on the converter or converter motor, but switch 97 must also be opened to prevent the automatic device from operating while working on the converter or converter motor. In addition to the switch 141, the panel 45 contains only power limiting cut-out mechanism and circuits of standard conventional type which cuts the circuit when a certain maximum current limit is reached. As these cut-out circuits form no part of the present invention, they are not described but only indicated in the drawings. A variable resistance 148 is provided in the motor circuit for starting and controlling the motor under manual operation.

It will be apparent that by closing the contactors 144 and 151 the motor will rotate in one direction and by opening these contacts and closing the contacts 143 and 149 it will operate in the opposite direction, thereby enabling the rotation of the motor in either direction to be controlled manually. When the machine is under manual control, current flows from the power main 10 through the switch conductor 27, switch 28, conductor 43, terminal 44 and switch 141 to the conductor 142 which is in contact with both control switches 143 and 144. When the switches 143 and 149 are closed, current flows from the conductor 142 through the motor armature, thence through the field 127, control and starting resistance 148, conductor 147, thence through the limit cut-off of the panel 45 to the conductor 145. Then the current flows through the switch 141 to the terminal 47, thence through the conductor 46, contacts 31, conductors 42 and 30 and contacts 26 to the conductor 24 and negative terminal 11. When the contacts 144 and 151 are closed, current flows from the conductor 142 through the motor, thence through the conductor 150 and contacts 123 which are now closed to the conductor 128 and thence to the field 127 and through the resistance 148, panel 145 and switch 141; thence through the same return circuit as described above. Thus it will be apparent that when the switch 141 is closed and the contacts 123 are closed, which latter is always closed when the motor is not under control of the pressure valve 62 or 63, the tilting motor may be manually controlled or reversed at will.

After the period of operation of the apparatus from the batteries and a resumption of the power in the power mains, the batteries may be charged directly from the mains 10 and 11. For this purpose a switch 152 is closed making contact between the power house mains 10 and 11 and the main 66 and a charging main 153, respectively. Current then flows from the main 10 through the switch 152 to the power line 66 and thence through the line 49 to the negative pole of the battery. From the positive pole the circuit is completed through the line 64 and fuse 63 to a resistance line 154 leading to a rheostat 155. Thence the circuit passes through a line 156 to a terminal board 157 to an ammeter 158 to a regulating circuit breaker 159, and thence to the return wire 153 and switch 152 to the negative main 11.

In the event that it is desirable to discharge the batteries, the motors may be operated from the batteries even though a source of power is present in the power house mains 10 and 11. For this purpose the switch 21 is opened, thereby cutting the circuits through the solenoid or coil 19 and the solenoids 13 and 17. The contactor 48 is accordingly closed, thereby permitting a circuit to pass through the solenoids 54 and 58 as described above. Inasmuch as the contactors 26 and 59 are always in reverse positions, they may be connected through a mechanical interlocking lever 160 and, in the same manner, the contactors 25 and 55 may be connected through a corresponding interlocking lever 161.

The invention may be applied to installations in which several tilting motors are employed for converters all supplied from a common air main. An arrangement of the control circuits for such an installation is illustrated in Fig. 2, the invention being shown by way of example as applied to four tilting motors. In this figure each of the circuits, contactors, solenoids, etc., has been numbered with the same numeral as in Fig. 1, only the wiring diagrams individually to the motors and exclusive of the air control valve and automatic power shifting connections being shown. In this arrangement the power lines 102, 43, 46 and 110 are continued to each of the motor wiring circuits and, for convenience in illustration, the manual reset 138 is shown in the return line 140 instead of in the line 137. Aside from the above change the above description will apply to Fig. 2 and, to avoid unnecessary repetition, the connections of this figure will not be described in detail.

In résumé it will be observed that the solenoid 19 and the switch 15 controlled thereby serve solely to control the automatic shifting connections of the apparatus from the power mains 10 and 11 to the storage battery mains 49 and 64 and to return them to the power house mains. When the power house mains are energized the solenoid 19 is energized and the switch 15 is closed thereby connecting in the closed circuit the solenoids 13 and 17 and closing the contactors 25 and 26, thus connecting the power house mains 10 and 11 with the power mains 27 and 30 respectively. When the solenoid 19 becomes de-energized through a failure of power in the mains 10 and 11 the switch 15 is opened thereby de-energizing the solenoids 13 and 17, opening the contactors 25 and 26 and disconnecting the mains 27 and 30 from the power mains 10 and 11 respectively. At the same time the switch 48 is closed, closing the circuit through the solenoids 54 and 58, closing the contactors 55 and 59 and connecting the power mains 27 and 30 to the storage battery lines 54 and 49 respectively. Upon a reappearance of power in the mains 10 and 11 the solenoid 19 is automatically energized, restoring the connections of the mains 27 and 30 to the mains 10 and 11. Power from the mains 27 and 30 is transmitted through the contactors 28 and 31 respectively to the terminals 47 and 44 of the manual control device for the tilting motors. The contactors 28 and 31 are closed by the energizing of the electromagnetic solenoids 34 and 36 which are included in a circuit connected at one end to the main 27 and at the other end through the wire 39, switch 40 and wires 41 and 42 to the opposite power main 30.

The switch 40 is closed by an electro-magnet 65 the circuit of which is in turn controlled by the pneumatic valve 71 and is opened when the pressure in the latter falls below a certain minimum so that when this minimum is reached and the switch 40 opened, the contactors 28 and 31 also open cutting the manual control device from the source of power. Simultaneously with the de-energizing of the solenoid 65 a circuit is closed from the wire 41 through a switch 91, line 93, limit switch 94, time control switch 96 to a solenoid 99 and thence to the opposite power wire 102. The solenoid 99 serves to close the switch 100 connecting a circuit from the main 102 through four solenoids 107, 111, 116 and 117 to open the contactor 123 and close contactors 120, 121 and 122. Current for operating the motor in tilting position thereby flows through the contactor 120 to one side of the armature 131 and through the contactor 122 through a resistance 126, thence through the field winding 127, thence through the wire 128 and closed contactor 121 and wire 130 to the opposite side of the armature 131.

Upon the breaking of the limit switch 94 as the converter reaches its correct tilted position the circuit through the solenoid 99 is opened, thereby de-energizing the solenoids 107, 111, 116 and 117 and opening the contactors 120, 121 and 122 and closing the contactor 123. The reset push button 139 is closed by hand and a reset switch 138 is closed when the controller is in the "off" position thereby restoring the circuit through control solenoids 65 by means of circuit wires 137 and 140 that by-pass the opened switch 69. When thus reset the circuits are in their normal position and the motor is under its normal manual control.

The common type of converter is that which is emptied by tilting it from the blowing position. There are, however, certain stationary converters and similar apparatus in which a blast is blown through the molten charge and the converter emptied from time to time by tapping and similar methods. In such stationary furnaces, the loss of pressure also involves injury by freezing of the charge in the converter and connections; and the present invention may be applied with advantage to the emptying of such converters by means of motors suitably arranged and connected.

What we claim is—

1. Apparatus of the type described which comprises a tilting converter, an air supply for said converter, a reversible electric motor and connections for tilting said converter, manual control means in a circuit for energizing said motor to shift said converter between tilted and upright positions, an air controlled switch connected to the air supply for said converter, automatic tilting means controlled by said air controlled switch for disconnecting said manual control means when the pressure in said supply means falls below a definite minimum and for thereupon actuating said motor to shift said converter to tilting position, means for stopping said motor when said converter reaches tilted position, and re-setting means for disconnecting said tilting means and restoring said manual control means.

2. Apparatus of the type described which comprises a tilting converter, an air supply for said converter, a reversible electric motor and connections for tilting said converter, manual control means in a circuit for energizing said motor to shift said converter between tilted and upright positions, an air controlled switch connected to the air supply for said converter, automatic tilting means controlled by said air controlled switch for disconnecting said manual control means when the pressure in said supply means falls below a definite minimum and for thereupon actuating said motor to shift said converter to tilted position, and re-setting means for disconnecting said tilting means and restoring said manual control means, said tilting control mechanism comprising a pair of contacts alternately opened and closed, one of said contacts being in the manual control circuit, and the other of said contacts being in the circuit of said automatic tilting means, and having control circuits to open the contacts of said manual control circuit and to close the contacts of said automatic tilting circuit for a definite time limit.

3. Apparatus of the type described which comprises a tilting converter, an air supply for said converter, a reversible electric motor and connections for tilting said converter, manual control means in a circuit for energizing said motor to shift said converter between tilted and upright positions, an air controlled switch connected to the air supply for said converter, automatic tilting means controlled by said air controlled switch for disconnecting said manual control means when the pressure in said supply means falls below a definite minimum and for thereupon actuating said motor to shift said converter to tilting position, means for stopping said motor when said converter reaches tilted position, resetting means for disconnecting said tilting means and restoring said manual control means, and means for breaking the circuit through said manual control means.

In witness whereof we have hereunto signed our names.

BERT S. HIND.
W. FRANK BELL.